United States Patent [19]

Siegal

[11] 3,874,804

[45] Apr. 1, 1975

[54] JOINT STRUCTURE

[75] Inventor: Burton L. Siegal, Chicago, Ill.

[73] Assignee: Tiffany Industries, Inc., St. Louis, Mo.

[22] Filed: May 10, 1974

[21] Appl. No.: 468,733

[52] U.S. Cl. ............................. 403/353, 403/381
[51] Int. Cl. ........................................ F16b 12/00
[58] Field of Search .......... 403/381, 331, 353, 401, 403/402, 339, 340; 52/753 T; 144/309 L

[56] References Cited
UNITED STATES PATENTS

| 1,082,567 | 12/1913 | Stitzer | 403/381 X |
| 2,369,930 | 2/1945 | Wagner, Sr. | 403/381 X |
| 2,510,243 | 6/1950 | Mohring | 403/353 X |
| 3,090,086 | 5/1963 | Fata | 403/381 |

Primary Examiner—Andrew V. Kundrat

[57] ABSTRACT

This joint structure is provided by a pair of identical extruded plates, each being mounted to a furniture component part, and each having a pair of lengthwise extending tongues of a dovetail configuration separated by a complementary groove. One of the common sidewalls between the groove and an adjacent tongue is laterally offset to provide a relatively wide portion of the groove and a relatively narrow portion of the adjacent tongue intermediate the ends of the plates. The widened intermediate portion of the groove of one plate is adapted to receive an end portion of the complementary tongue of the other plate, and the narrowed intermediate portion of the tongue of the one plate is adapted to be received within an end portion of the groove of the other plate, when the plates are widthwise reversed and partially overlapped in length, to facilitate assembly of the parts.

5 Claims, 7 Drawing Figures

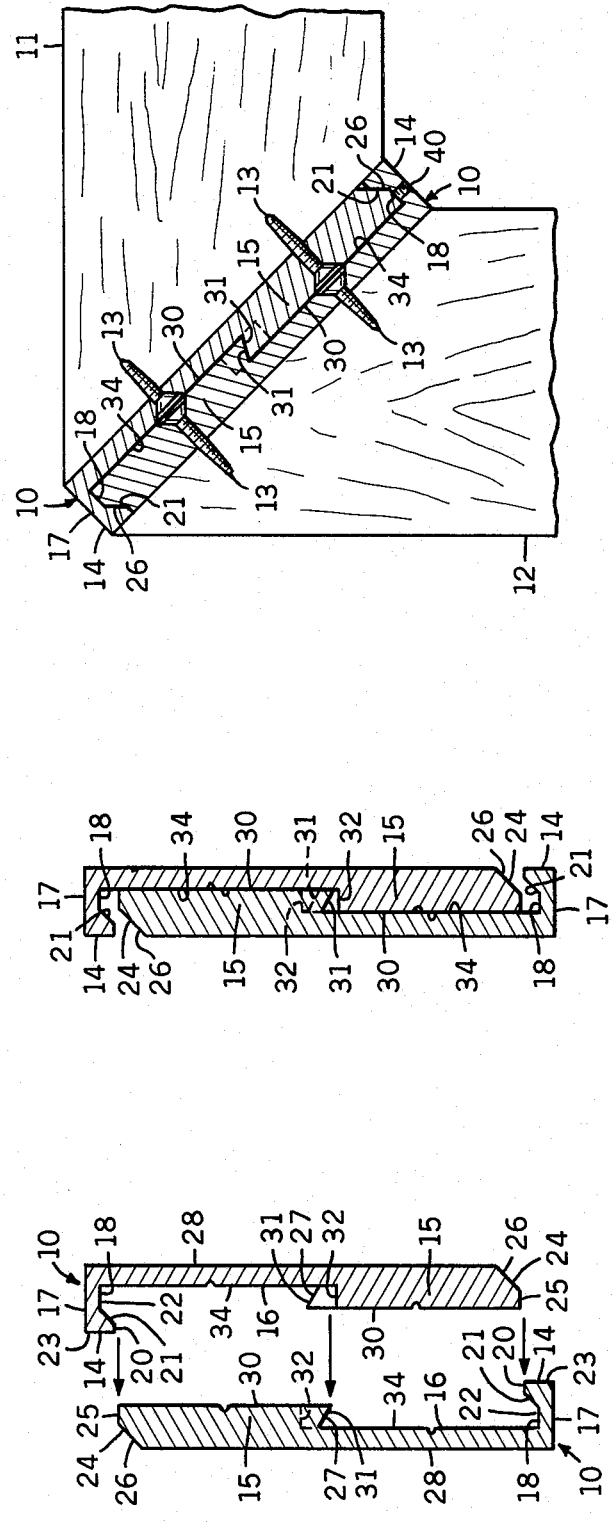
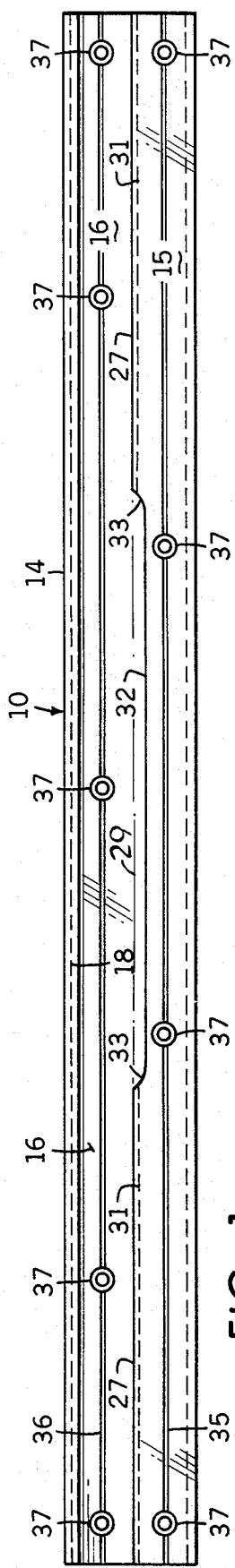

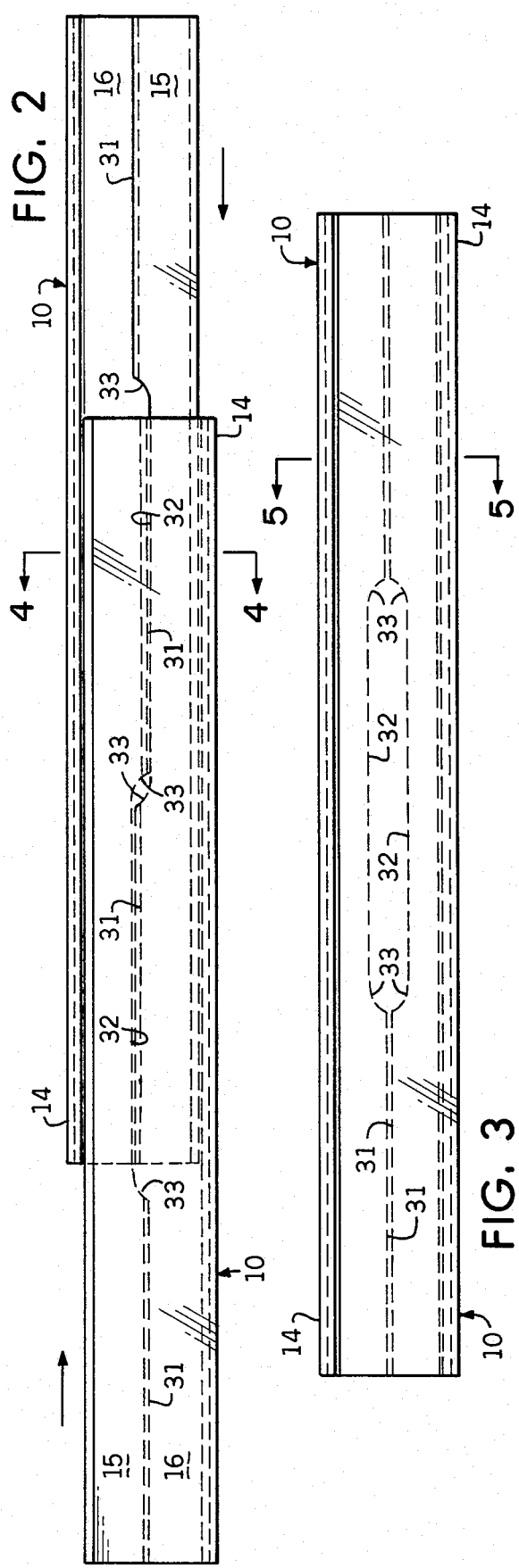
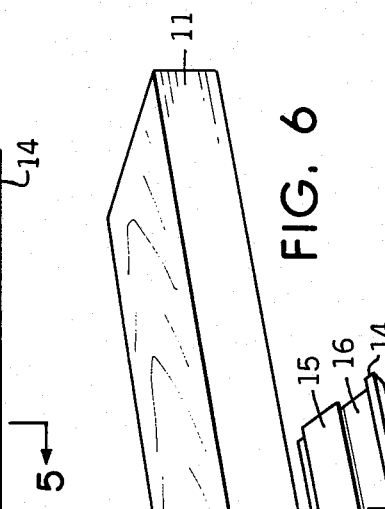
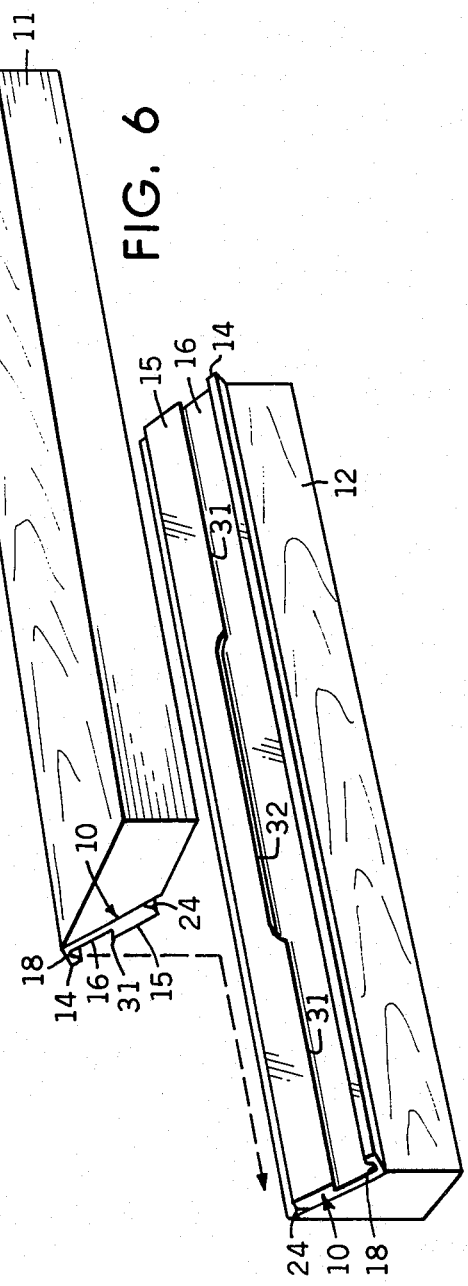

JOINT STRUCTURE

BACKGROUND OF THE INVENTION

This invention relates generally to a joint structure and particularly to a preformed corner joint, suitable for joining component parts of furniture, which facilitates assembly and disassembly of the furniture.

Because of the high cost of shipping and the labor costs incurred in preassembling furniture and shelving, it is a distinct advantage if such merchandise can be shipped in a knocked-down condition and assembled at the destination point. For this reason furniture joints which provide these advantages are highly desirable.

Conventional corner joints for wood furniture such as desks, cabinets and the like have, until the recent past, been made by dovetailing, or alternatively, by doweling or screwing the connected parts together. Dovetailing requires highly skilled craftsmen and, because the joint is glued, does not readily permit disassembling of the joined parts. Doweled or screwed joints tend not only to suffer from the disadvantage that they cannot be readily disassembled but, in addition, produce comparatively unstable furniture joints. In the case of metal furniture a variety of welding, bolting and clipping techniques has been used. Welding is obviously unsatisfactory from the point of view of disassembly and the various, known bolt and clip connections tend not only to be complicated but also to produce unstable furniture.

One known miter joint of the type under consideration does provide preformed corner joints, in that longitudinal preformed interengaging members are utilized and does provide an improvement over the prior joints discussed in that it provides for knockdown shipment and permits assembly of the article at the point of use. However, this joint suffers from at least two disadvantages. For example, the parts to be assembled must initially be disposed in end-to-end relation and require a great deal of clearance room, which is not always available. In addition, if the components are not absolutely accurately aligned, there is a strain placed on the initially engaged end portions, which frequently results in distortion and breakage of parts.

The present corner joint solves these and other problems in a manner not disclosed in the known prior art.

SUMMARY OF THE INVENTION

This joint structure provides a pair of identical extruded plates having longitudinally extending projections, providing a complementary tongue and groove configuration, so that the plates are lengthwise interengageable when widthwise reversed.

The plates are particularly useful for miter joints and as miter plates provide prefabricated ends for furniture components so that the components may be readily assembled in dovetail relation.

The groove is widened over the intermediate portion of its length and at least one of the tongues is narrowed over the same length so that the plates can be face-to-face interfitted without being first endwise aligned. One miter plate can be used to support the other miter plate during initial alignment.

The widened intermediate portion of the groove is longer than each of the end portions of the tongue so that the sliding engagement is reduced to one-third or less, which reduces the chances of galling when aluminum shapes are used.

Because the miter plates are not slidingly engaged for the full length of the plates the amount of tolerance between interfitted parts can be considerably reduced. The tolerance reduction is proportionate to the sliding length actually required to the overall length of the plates and has the advantage of enabling a closer fit to be achieved between dovetailed parts.

It is an important object of the invention to provide a pair of extruded miter plates each including first and second tongues having lengthwise extending inner and outer sidewalls and a groove disposed therebetween, the lengthwise extending sidewalls of the groove being provided by the inner sidewalls of the first and second tongues, and the groove of one plate receiving one of the tongues of the other plate when the plates are widthwise reversed.

It is an object to provide the inner sidewalls defining the groove with transverse portions overlapping and retaining said received tongue when the plates are in their lengthwise coextensive installed condition.

Yet another object of the invention is to provide at least one of said inner sidewalls with longitudinally aligned end portions and a transversely offset intermediate portion, said intermediate portion having a length greater than said end portions, and said intermediate portion widening the groove and narrowing the adjacent tongue so that a relatively wide intermediate portion of the groove of one plate receives a relatively wide end portion of the tongue of the other plate, and a relatively narrow end portion of the groove of one plate receives a relatively narrow portion of the tongue of the other plate, when the plates are widthwise reversed and lengthwise overlapped in an incipient installed condition. This structural relationship of parts provides that the fully installed condition can be achieved by relative sliding of the plates over a length substantially equal to the length of the end portion of said inner sidewall rather than over the entire length of the plates.

It is another object to provide the offset portion of the common sidewall by machining away part of the initially extruded portion of said sidewall.

Yet another object is to provide transition, camming portions at each end of the offset portion.

It is an object to provide that the outer sidewall of the first tongue defines an exposed margin of the interengaged plates and to provide that the inner sidewall of the second tongue defines the offset portion by widening the groove and narrowing said second tongue.

It is an important object of the invention to provide a miter joint connection, which is formed from relatively inexpensive identical extruded plates which can be easily fitted together by anyone without special instruction.

BRIEF DESCRIPTION OF THE DRAWINGS

FIG. 1 is an elevational view of a single miter plate;

FIG. 2 is a simplified elevational view of a pair of plates in an incipient installation condition;

FIG. 3 is a similar view to FIG. 2 illustrating a pair of plates in a fully installed condition;

FIG. 4 is a cross-sectional view taken on line 4—4 of FIG. 2 with the plates in a spaced-apart condition;

FIG. 4A is a similar view with the plates in a face-to-face incipient installed condition;

FIG. 5 is a cross-sectional view taken on line 5—5 of FIG. 3 with miter plates attached to furniture component parts; and FIG. 6 is a fragmentary perspective view showing a preinstallation position of typical furniture component parts with the miter plates attached.

DESCRIPTION OF THE PREFERRED EMBODIMENT

Referring now by characters of reference to the drawings and first to FIGS. 1 and 5 it will be understood that the completed joint structure shown in FIG. 5 is formed from a pair of elongate miter plates 10, each of which is attached to a component part of the furniture designated by numerals 11 and 12, as by screws 13. In the preferred embodiment the plates 10 are identical and are widthwise reversed to achieve the interengaged, installed condition, each plate 10 being provided with complementary tongue and groove portions and both plates having an identical extruded shape.

The specific configuration of the miter plate 10 is best understood by reference to FIGS. 1 and 4. Each plate 10 includes lengthwise extending projecting portions, indicated by numerals 14 and 15, and constituting first and second tongues. The tongues 14 and 15 are spaced apart to define a lengthwise extending recess constituting a groove 16, which is compatibly configured to receive the complementary tongue 15 in retained relation. The tongue 14 is defined by an outer sidewall 17; an inner sidewall 18, which includes flat portions 20 and 22 flanking an intermediate bevelled portion 21; and a top wall 23. The tongue 15 is defined by an outer sidewall 24, which includes a flat portion 25 and a bevelled portion 26; an inner sidewall 27; and a top wall 30. The inner sidewall 27 is divided along its length into end portions 31, which are bevelled; an intermediate portion 32, which is offset from the bevelled end portions 31; and curved transition portions 33. In the preferred embodiment this important structural relationship of parts is provided by removing a portion of an originally continuously extruded bevelled sidewall, indicated in phantom outline by numeral 29, as by milling.

The groove 16 is defined by the inner sidewalls 18 and 27 of the tongues 14 and 15 respectively; and a bottom wall 34 extending between said sidewalls 18 and 27. A rear wall 28 completes the definition of the cross section of the plate 10.

The bevelled inner sidewall portions 21 and 31 defining the groove 16 effectively overlap the bottom wall 34 and form a dovetail configuration which is too narrow at its mouth to receive the relatively wide portion of the tongue 15 defined by sidewall portion 31, when the miter plates 10 are in a face-to face lengthwise coextensive condition. Thus, if the width of the tongue 15 were constant and the width of the groove 16 were constant it would be necessary to install the two plates, by disposing them in end-to-end relation, in exact complementary axial alignment and inserting one into the other as a key is inserted into a keyhole. However, by offsetting the inner sidewall 27 for an intermediate portion of its length, the groove 16 is effectively relatively widened and the tongue 15 is effectively relatively narrowed over this length.

With the structure shown in FIGS. 2, 4 and 4A, when the length of the bevelled end portions 31, defining the relatively wide portion of the tongue 15, is sufficiently shorter than the intermediate offset portion 32 defining the relatively wide portion of the groove 16, the miter plates can be placed in face-to-face relation and received one within the other. Once this incipient installation condition has been achieved, as particularly shown in FIG. 4A, the miter plates 10 can be telescoped into each other, the telescoping action being facilitated by the mutual camming action of the transition portions 33 of the grooves, which urge the outer sidewalls 24 of one element into engagement with the associated inner sidewalls 18 of the other element and also urge the bevel portions 31 of sidewalls 27 of one element into engagement with the corresponding bevel portions 31 of the other element. Because of the transversely overlapping bevel configuration of the sidewalls 21 and 24 and the sidewalls 31, the result of sliding the miter plates 10 into a longitudinally coextensive installed condition as shown in FIG. 3, is a complete interlocking of parts as clearly shown in FIG. 5.

To facilitate attachment of the individual miter plates 10 to the furniture components 11 and 12, each plate 10 includes longitudinal guide recesses 35 and 36 in the tongue 15 and the groove 16 respectively, along which are provided a plurality of spaced countersunk bored holes 37 to receive screws 13.

It is thought that the structural features and functional advantages of this miter joint have become fully apparent from the foregoing description of parts but for completeness of disclosure the connection of a typical joint structure will be briefly described with particular reference to FIG. 6.

FIG. 6 illustrates the connection between a horizontal furniture component such as a desk top 11 and a vertical component such as a desk leg 12.

In the preferred embodiment the relatively wide portion of the groove 16, as defined by the intermediate offset sidewall portion 32, extends over a length slightly in excess of one-third of the overall length. The flanking, constant width end portions of the groove 16, as defined by the bevelled sidewall portion 31 are therefore less than one-third of the overall length. The miter plate 10 attached to horizontal component 11 is oriented so that the tongue 14 is uppermost; the miter plate 10 attached to the vertical member 12 is widthwise reversed so that the tongue 14 is lowermost. The upper and lower miter plates 10 are disposed relative to each other so that the plates overlap longitudinally for about two-thirds of their length with the result that a relatively wide end portion of the tongue 15 of each plate 10, is in substantial alignment with a relatively wide intermediate portion of the groove 16. As shown by FIGS. 4 and 4A this permits the plates 10 to be brought together in face-to-face relation so that tongue and groove faces 30 and 34 are in substantial engagement, in an incipient installation condition; and the upper miter plate 10 can be lowered by gravity so that the transverse overlapping portions of the tongues 14, provided by the bevel portions 21 of the inner sidewalls 18, overlap the corresponding bevel portions 26 of the outer sidewall 24. Following such overlapping engagement, the uppermost tongue 14 is supported by the uppermost tongue 15 and the miter plates 10 can be moved relatively in a longitudinal direction until coextensive longitudinal alignment is achieved and the bevel portions 31 of the sidewalls 27 are disposed in overlapping retained relation.

In the above description it has been assumed that the left hand miter plate 10 (FIGS.. 4 and 4A) was relatively stationary and the right hand plate was lowered into position by being hooked, as it were, over the left hand plate.

In those instances in which the right hand plate is relatively fixed, the cam transition portions 33 of the inner sidewall 27 considerably facilitate installation of plates. For example, when the right hand plate is relatively fixed and the plates 10 are brought together in face-to-face relation so that the tongue and groove faces 30 and 34 are in substantial engagement, in an incipient installation condition, the bevel and the flat portions 31 and 32 of the sidewall 27 of one miter plate 10 support the complementary parts of the other miter plate 10. Following such engagement the lower miter plate 10 can be moved longitudinally and cammed upwardly by transition portions 33 with the result that the two miter plates 10 are brought into a longitudinally coextensive overlap condition. The camming action results in relative lateral shift of the plates 10 against gravity and brings the associated bevel portions 31 of the sidewalls 27 into overlapping relation and also brings the bevel portions 21 of the tongue 14 into overlapping relation with the bevel portion 26 of the tongue 15, the mutual overlapping of bevel parts producing a secure dovetail joint.

Once the plates 10 are in coextensive longitudinal alignment they can be secured against further longitudinal movement as by grubs screw 40 indicated in FIG. 5. The resulting joint when viewed from the outside is defined by a relatively narrow outer wall 17 which presents a clean, simple line to the observer.

It can be seen that the completed joint is in dovetail relation for approximately two-thirds of its length. By providing the groove with two or more widened portions the amount of initial longitudinal overlap can be increased with the result that the joint can be achieved in an even more confined space but at the expense of the amount of dovetail overlap between the interengaged plates.

I claim as my invention:

1. A joint structure for joining furniture parts comprising:
   a. a pair of lengthwise interengageable elongate elements each adapted to be attached to one of the parts to be joined and each including:
      1. a first tongue having lengthwise extending inner and outer sidewalls,
      2. a second tongue having lengthwise extending inner and outer sidewalls,
      3. a groove disposed between said first and second tongues said groove having lengthwise extending sidewalls provided by said first and second tongue inner sidewalls, said groove of one element receiving one of the tongues of the other element, said inner sidewalls including transverse portions overlapping and retaining said received tongue when the elongate elements are in a widthwise reversed, and lengthwise coextensive, installed condition, and
      4. one of said inner sidewalls in each element including a transversely offset portion relatively narrowing the received tongue and relatively widening the receiving groove adjacent thereto for a portion of the length thereof sufficiently so that a relatively wide portion of the receiving groove receives a relatively wide portion of said received tongue, and a relatively narrow portion of the receiving groove receives a relatively narrow portion of said received tongue when the elongate elements are in widthwise reversed relation and said elements are lenthwise offset in an incipient installed condition so that the fully installed condition can be achieved from an initially longitudinally overlapped disposition of parts.

2. A joint structure for joining furniture parts as defined in claim 1, in which:
   b. the plates are identical in configuration, and
   c. the offset portion is disposed intermediate the ends.

3. A joint structure for joining furniture parts as defined in claim 2, in which:
   d. the intermediate offset portion includes transition camming portions at each end extending between the inner sidewall portions defining the relatively wide and relatively narrow tongue portions.

4. A joint structure for joining furniture parts as defined in claim 3, in which:
   e. the outer sidewall of the first tongue defines an exposed margin of the interengaged plates, and
   f. the inner sidewall of the second tongue includes the offset portion.

5. A joint structure for joining furniture parts comprising:
   a. a pair of lengthwise interengageable extruded elongate plates each adapted to be attached to one of the parts to be joined and each including:
      1. a first tongue having lengthwise extending inner and outer sidewalls,
      2. a second tongue having lengthwise extending inner and outer sidewalls,
      3. a groove disposed between said first and second tongue said groove having lengthwise extending sidewalls provided by said first and second tongue inner sidewalls said groove of one plate receiving one of the tongues of the other plate, said inner sidewalls including transverse bevel portions overlapping and retaining said received tongue when the elongate plates are in a widthwise reversed, lengthwise coextensive installed condition, and
      4. one of said inner sidewalls in each plate including aligned end portions of substantially equal length and a transversely offset intermediate portion having a length greater than said end portions, the offset portion relatively narrowing the received tongue and relatively widening the receiving groove adjacent thereto so that a relatively wide portion of the receiving groove receives a relatively wide portion of said received tongue, and a relatively narrow portion of the receiving groove receives a relatively narrow portion of said received tongue when the plates are disposed in widthwise reversed relation and said elements are lengthwise offset in an incipient installed condition so that the fully installed condition can be achieved from an initially longitudinally overlapped disposition of parts by relative sliding of the plates over a length substantially equal to the length of one of the end portions of said inner sidewall.

* * * * *